United States Patent Office 3,703,563
Patented Nov. 21, 1972

3,703,563
POLYACRYLAMIDE-EPOXIDIZED AMINOPLAST-UREA CONDENSATES
Stanley A. Lipowski, Livingston, and John C. Queen, Jr., Haworth, N.J., assignors to Diamond Shamrock Corporation, Cleveland, Ohio
No Drawing. Filed June 21, 1971, Ser. No. 155,253
Int. Cl. C08g 45/04
U.S. Cl. 260—836
8 Claims

ABSTRACT OF THE DISCLOSURE

A polymeric cationic condensate is synthesized by reacting a polyacrylamide with an epoxidized aminoplast to form a pre-condensate and then further reacting the pre-condensate with urea. The product is a stable, water soluble composition, useful in paper manufacturing applications as a pigment retention aid, to give improved dry strength, and as a pitch dispersant.

BACKGROUND OF THE INVENTION

(1) Field of the invention

This invention relates to polyacrylamide-epoxidized aminoplast-urea condensates, their synthesis, and their uses in paper manufacture as pigment retention aids, to improve dry strength, and as pitch dispersants.

(2) Description of the prior art

Mixtures of polyacrylamide and (non-epoxidized) aminoplast resins are known in the art. U.S. Pat. No. 3,509,021 discloses such a mixture to be used as a pigment retention aid. Such mixtures have very low pigment retention aid activity and are therefore of limited commercial value. Slightly similar mixtures such as an aqueous solution of a (non-epoxidized) amino-aldehyde resin and polyacrylamide are disclosed in U.S. Pat. No. 2,862,901. None of the prior art, however, teaches the reaction of these resins either with each other or followed by a further reaction with urea, so as to form a stable condensate. Moreover, most commercial pigment retention aids are solids with varying degrees of solubility.

SUMMARY OF THE INVENTION

This invention relates to stable polymeric cationic condensates and to a two-step process for synthesizing such condensates by first reacting a polyacrylamide with an epoxidized aminoplast to form a pre-condensate and then further reacting the pre-condensate with urea or a substituted urea. The condensates are useful in paper manufacture as pigment retention aids, to give improved dry strength, and as pitch dispersants.

DESCRIPTION OF THE PREFERED EMBODIMENTS

The condensates of the present invention can be used in the production of paper such as bond paper, liner paperboard, bleached paperboard, offset paper, mimeograph paper, or the like. By the term "paper" is meant both paper and paperboard. These condensates are particularly useful as dry strength agents, pigment retention aids and pitch dispersants in papermaking. From about 0.25 part by weight to about 20 parts by weight of the condensates (dry) are usually added to 2000 parts by weight of paper pulp based on fiber weight (dry). The condensates are added to the pulp stock. The compositions can be added in concentrated or dry form provided they mix uniformly with the pulp in a relatively short time. The condensates are usually added after refining and after alum addition in the papermaking process. The condensates are useful in increasing the dry strength in both sulfite and kraft paper as well as paperboards. They are also useful in increasing pigment retention when filler pigments such as titanium dioxide and clays are used in the papermaking processes. An unexpected additional useful property of these condensates is that they act as pitch dispersants when added to paper pulp.

The polyacrylamide must be water soluble, preferably non-ionic, and straight chain, and can be prepared by solution polymerization of acrylamide in a redox-catalyst system. It can also be prepared by other procedures provided such procedures do not result in hydrolysis of amide groups, crosslinkage of polymer chains, polymer degradation, or the like. Various procedures for obtaining aqueous polyacrylamide solutions will be found in the subsequent examples. The viscosity range of a 10% aqueous solution can be from about 500 cps. to about 50,000 cps. The preferred viscosity range is from about 3,000 cps. to about 10,000 cps.

The expoxidized aminoplast must be water soluble and is the reaction product of (A) an amine base selected from the group consisting of dicyandiamide, guanidine, guanylurea, ammeline, melamine, salts thereof, and mixtures thereof;
(B) formaldehyde, or formaldehyde liberating compositions such as, paraformaldehyde, trioxane, and hexamethylenetetramine, and mixtures thereof; and
(C) an aliphatic amine containing at least two amine moieties of which one must be a primary. Examples of suitable amines include, but are not limited to, diethylenetriamine, (DETA), `dimethylaminopropylamine (DMAPA), tetraethylenepentamine (TEPA), triethylenetetramine (TETA), pentaethylenehexamine (PTHA), ethylenediamine (EDA), 1 - (2 - aminoethylamino)-2-propanol, 3-(di - n - butylamine)-propylamine, and the like, and mixtures thereof;
(D) when ingredients A, B, and C are reacted so as to form an aminoplast, said aminoplast is then epoxidized by reaction with epichlorohydrin, epibromohydrin, a substituted epichlorohydrin, a substituted epibromohydrin, or mixtures thereof.

The term urea as used in step 2 of the synthesis may be urea or an aliphatic-substituted urea in which at least two active hydrogen moieties remain, or mixtures thereof. Examples of some of the substituted ureas that can be utilized are N-acetylthiourea, allylurea, n-butylurea, diethylurea, propylurea, and the like.

The molar ratios for synthesis of the aminoplast are 1 mole of group A, 2–6 mole of group B, 0.5–2.0 mole of group C, and 0.5–2.0 mole of group D.

The molar ratios of the finished product are 1–10 mole of polyacrylamide reacted with 1 mole of epoxidized aminoplast. The resulting intermediate reaction product is then further reacted with sufficient urea to bridge all free reactive groups on the chain plus a slight excess.

A typical example of molar ratios using specific ingredients would be a polyacrylamide prepared from 1.0 mole acrylamide, 0.1493 mole isopropyl alcohol, and 0.000478-0.000717 mole potassium persulfate and an epoxidized aminoplast prepared from 1.0 mole dicyandiamide, 3.0 mole formaldehyde, 1.0 mole diethylenetriamine, and 1.0 mole epichlorohydrin. The final reaction product would be prepared from 1.0 mole polyacrylamide, 0.205 mole epoxidized aminoplast, and 2.616 moles urea.

It is believed that in the production of the aminoplast, the following reactions take place:

(1) methylolation of the primary and secondary amine groups of the group A ingredient;
(2) methylolation of the primary groups of the group C ingredient;

(3) polymerization with one or more of the following reactions taking place:
  (a) methylene bridge formation by water elimination,
  (b) ether linkage formation through two hydroxyls,
  (c) methylol methylene bis-amide linkage through one hydroxyl and one secondary amine,
  (d) methylene bis-amide linkage through one hydroxyl and one primary amine,
  (e) azomethine linkage through internal ring formation; and
(4) epoxidation of the secondary or higher amine groups.

In the synthesis of the final product, it is believed that the following reactions take place:

(1) in the first stage where the polyacrylamide is reacted with the epoxidized aminoplast, crosslinking occurs through either the free methylol groups or through the epi moiety;
(2) in the second stage, where urea is introduced, any remaining methylol groups and free epi groups of the still reactive prepolymer react with the amide groups of the urea and form the final stable polymer.

It is considered critical to use a two-step process. If the polyacrylamide, epoxidized aminoplast, and urea are reacted simultaneously, the urea will tend to inactivate the epoxidized aminoplast which will therefore not react with the polyacrylamide. Moreover, if the aminoplast is not epoxidized, no reaction will result between the polyacrylamide and the aminoplast.

It was proven that the urea reacted with the pre-condensate (rather than merely forming a mixture) in the following manner. A spectrophotometric determination of free urea was conducted based upon the yellow-green solution produced when p-dimethylaminobenzaldehyde reagent solution was added to the final condensate. This method is substantially described at 26 Analytical Chemistry 452 (March 1954). Since usually an equal amount by weight or more of urea is added to the pre-condensate, a mere mixture would indicate at least 50% free urea. The results of determination of free urea of four laboratory batches of condensate prepared according to Example I yielded free urea percentages of 6.6, 7.4, 7.9 and 9.1 respectively. This indicates that at least 80% of the amount of urea added reacted with the pre-condensate. It should be borne in mind that an excess of urea is added in order to ensure a complete reaction.

The condensates can be evaluated in papermaking in the following manner. The condensates are used in the form of dilute solutions for purposes of convenience. The dilute solution of the condensate is added to the paper pulp stock and the treated stock is used to prepare handsheets. From about 0.25 part by weight to about 20 parts by weight of the composition dry is added to about 2000 parts by weight of the pulp based on the dry fiber weight. The dry strength of the resulting handsheets is then determined by the TAPPI Standard Procedure T 403-ts 63-Bursting Strength of Paper and the pigment retention of the handsheets is determined as percent ash by the TAPPI Standard Procedure T 413-ts 66-Ash in Paper. Results obtained with handsheets prepared from the treated pulp stock are then compared with the results obtained with handsheets prepared from untreated pulp stock from the same pulp source.

EXAMPLE I (A) Preparation of a polyacrylamide resin 778 g. water and 100 g. acrylamide (about 1.4 mole) were mixed together in a reaction flask under a rapid stream of nitrogen. The mixture was heated to 58° C. and agitated until dissolved. After a uniform clear solution resulted the nitrogen sparge was continued for 1 hour. A freshly prepared solution of 0.18 g. of potassium persulfate 0.00066 mole in 6.5 g. water was added, followed by 12.5 g. of isopropyl alcohol. The exothermic reaction raised the temperature of the mixture to 65° C. After 3 hours of agitation at 65° C. a freshly prepared solution of 0.12 g. of potassium persulfate (0.00044 mole) in 3.7 g. water was added and the solution heated to 75° C. After 1 hour of agitation at 75° C., 100 g. water was added and the reaction mixture was cooled to room temperature.

The resulting polyacrylamide in water solution was clear, white in color, contained 10% solids and had a viscosity of 7,500 cps. at 25° C. when measured on the Brookfield Viscometer with spindle No. 3 at 12 r.p.m. The pH of the 10% solution was 7.5.

(B) Preparation of an epoxidized aminoplast resin 84 g. dicyandiamide (1 mole), 243 g. uninhibited 37% formaldehyde aqueous solution (3 moles) were mixed together in a reaction flask equipped with an agitator and a reflux condenser. 103 g. diethylenetriamine (1 mole) were added slowly during a 20 minute period. The resulting exothermic reaction had a final temperature of 95° C. The mixture was heated to reflux (101° C.) and refluxed for 1 hour and 15 minutes. After cooling to room temperature (22° C.), 92.5 g. of epichlorohydrin (1 mole) was added slowly during a period of 2 hours. The exothermic reaction carried the temperature to a maximum of 75° C. The mixture was then heated to 85° C. and kept at 85° C. for 15 minutes. After cooling to 60° C., 380 g. of water was added and the solution was cooled to room temperature. The resulting product was a clear red-brown liquid, containing 38% solids and a pH=7.0 in 10% solution (3.8% solids).

(C) Preparation of the final condensate (in solution)

1000 g. of the 10% polyacrylamide solution (A) were mixed with 750 g. water and the mixture was heated to 80° C. 245 g. of the 38% epoxidized aminoplast solution (B) were added and the temperature dropped to 74° C. The mixture was agitated at 72°-74° C. and three distinct periods of the reaction were noted. For the first 60 minutes the initial viscosity of 130 cps. (measured at 60° C.) rose gradually to 230 cps. After 1 hour and 40 minutes reaction time a more rapid rise in viscosity took place (600 cps. at 60° C.). In the third period of the reaction, after a total time of 1 hour and 50 minutes, the viscosity rose to 1360 cps. (at 60° C.), the pre-condensate approaching the gelation point. A previously prepared solution of 215 g. of urea in 350 g. water was added and the temperature of the mixture dropped to 65° C. The condensate was agitated for 1 hour and 20 minutes and the initial viscosity of 400 cps. at 25° C. dropped to 340 cps. at 25° C.

The resulting product was an orange-red solution, containing 16% solids, with a pH of a 10% solution=7.2. The shelf life of the material at room temperature and on accelerated oven tests of 60° C. was excellent and no rise in viscosity or gelation occurred. This material was within the scope of this invention.

EXAMPLE II

Preparation of a polyacrylamide resin

A polyacrylamide solution was prepared in a similar manner to Example I(A). 61 g. acrylamide (0.86 mole) were dissolved in 500 g. water. 10 g. isopropanol and 0.5 g. potassium persulfate (0.00185 mole) were added. The reaction was run for 2 hours at 80-85° C., and then 40 g. water were added.

The resulting polyacrylamide solution was water white, contained 10% solids and had a viscosity of 1,100 cps. at 25° C. (Brookfield Viscometer, spindle No. 2, at 12 r.p.m.).

EXAMPLE III

Preparation of a polyacrylamide resin

The polyacrylamide solution was prepared under similar conditions as Example I(A). 60 g. of acrylamide were dissolved in 600 g. water. 5 g. isopropanol and 0.05 g.

potassium persulfate (0.00185 mole) were added and the reaction was run at 40–45° C. for 6 hours.

The resulting polyacrylamide solution was water white, had a solids content of 9% and a viscosity of 24,000 cps. (Brookfield, spindle No. 4), at 6 r.p.m.

EXAMPLE IV

Preparation of an epoxidized aminoplast resin 42 g. dicyandiamide (0.5 mole) and 122 g. uninhibited 37% formaldehyde solution (1.5 mole) were mixed together and 51 g. of dimethylaminopropylamine (0.5 mole) was added slowly. The temperature during the addition rose to a maximum of 75° C. The mixture was cooled to 45° C. and 46 g. of epichlorohydrin (0.5 mole) were added during a period of 15 minutes. The solution was heated to 75° C. and kept between 75° and 80° C. for 1.5 hours. The reaction mixture was then diluted with 100 g. water.

EXAMPLE V

Preparation of an epoxidized aminoplast resin 42 g. dicyandiamide (0.5 mole) and 162 g. formaldehyde 37% (2.0 mole) were mixed together. 68 g. of tetraethylenepentamine (0.4 mole) were added slowly during a period of 15 minutes. The solution was refluxed for one hour (temperature 100° C.) and 400 g. water were added. 37 g. of epichlorohydrin (0.4 mole) were added slowly during a period of 20 minutes at 50° C. After completion of the addition the temperature was raised to 75° C. and the reaction mixture was kept at 75–80° C. for 2 hours.

EXAMPLE VI

Preparation of the final condensate (in solution)

76 g. of the 10% polyacrylamide solution prepared according to the procedure of Example II and 60 g. water were mixed together and heated to 60° C. 19.6 g. of the epoxidized aminoplast solution prepared according to Example I(B) was added and the mixture was agitated for 2 hours at 75–80° C., then for 1 hour at 85–90° C. At this point the reaction mass approached the gelation stage and a pre-condensate was formed. 16.8 g. urea dissolved in 27.6 g. water were added and the agitation continued for 1 hour at 60° C. The resulting product was an orange colored solution containing 16% solids.

EXAMPLE VII

Preparation of the final condensate (in solution)

82 g. of the 9% polyacrylamide solution prepared according to the procedure of Example III and 54 g. of water were mixed together and heated to 60° C. 19.6 g. of the epoxidized aminoplast solution prepared according to Example I(B) were added and the mixture was agitated at 75–80° C. for 1.5 hours. At this point the reaction mixture approached the gelation phase and a solution of 16.8 g. urea in 27.6 g. water was added. The agitation was continued for 1 hour at 60° C. The resulting product was an orange solution containing 16% solids.

EXAMPLE VIII

Preparation of the final condensate (in solution)

95 g. of the 9% polyacrylamide solution prepared according to the procedure of Example III and 47.5 g. water were mixed together and heated to 60° C. 30 g. of the epoxidized aminoplast resin prepared according to Example V were added and the mixture was heated to 80° C. After 20 minutes of agitation the gelation phase was approached and 19 g. urea dissolved in 85 g. water was added and the mixture agitated for 1 hour at 60° C.

The resulting product was a light yellow solution containing 13% solids.

EXAMPLE IX

Preparation of the final condensate (in solution)

200 g. of the 9% polyacrylamide solution prepared according to the procedure of Example III and 100 g. water were mixed together and heated to 60° C. 34 g. of the epoxidized aminoplast resin prepared according to the procedure of Example IV were added. The mixture was heated to 85° C. and agitated at 85–90° C. for 40 minutes. The gelation point was approached and a solution of 39 g. urea in 102 g. water was added. The mixture was agitated at 60° C. for 1 hour.

The resulting product was a light yellow solution containing 16% solids.

EXAMPLE X

Preparation of the final condensate (in solution)

184 g. of the 10% polyacrylamide solution prepared according to the procedure of Example II and 50 g. water were mixed together and heated to 60° C. 62.8 g. of the epoxidized aminoplast resin solution prepared according to the procedure of Example V were added. The mixture was heated to 80° C. and agitated for 30 minutes at 80–85° C. to approach the gelation phase. A solution of 39 g. urea dissolved in 139 g. water was added and the mixture was agitated at 60° C. for 1 hour.

The resulting product was a yellow solution containing 16% solids.

EXAMPLE XI

Preparation of the final condensate (in solution)

184 g. of the 10% polyacrylamide solution prepared according to the procedure of Example II and 100 g. water were mixed together and heated to 60° C. After addition of 34 g. of an epoxidized aminoplast resin, prepared according to the procedure of Example IV, the solution was agitated for 2 hours at 85–90° C. Close to the gelation point a solution of 39 g. urea in 118 g. of water was added and the mixture was agitated for 1 hour at 60° C.

The resulting product was a light yellow solution containing 16% solids.

EXAMPLE XII (A) Preparation of an epoxidized aminoplast resin 95.5 g. guanidine hydrochloride (1 mole), 243 g. uninhibited formaldehyde 37% (3 mole) were mixed together and 103 g. diethylenetriamine (1 mole) were added slowly during a 30 minute period. The mixture was then heated to reflux and refluxed for 1 hour. After cooling to room temperature, 92.5 g. of epichlorohydrin were added during a period of 2 hours. A maximum temperature of 70° C. was reached at the end of addition. The mixture was heated to 85° C. and kept at 85° C. for 20 minutes. 400 g. water were added and the solution cooled to room temperature (i.e. about 20° C.).

(B) Preparation of the final condensate (in solution)

1000 g. of the 10% polyacrylamide solution prepared according to Example I(A) and 750 g. water were mixed together and heated to 75° C. 250 g. of the epoxidized aminoplast resin solution prepared above (A) were added and the mixture was agitated for 1.5 hours. At this point a rapid increase in viscosity was noted and a solution of 220 g. urea in 360 g. water was added and the mixture was agitated at 60–65° C. for 1.5 hours.

The resulting product was an orange colored solution containing about 16% solids.

The determination of the amount of urea required to fully react with all free groups remaining on the pre-condensate is extremely difficult to calculate, and was therefore determined for this and the preceeding examples by the following method. A 10 g. sample of the pre-condensate was reacted with 30 g. of urea, yielding a solution that contained both the fully reacted condensate and an excess of free urea. Using the spectrophotometric determination described earlier, the amount of free urea was calculated. Subtracting that amount from the original 30 g. of urea gave the amount that entered into the reaction with the 10 g. of pre-condensate. From this, mole ratios were calculated and in producing the condensate, urea was added in the calculated ratio plus an excess of up to 20% in order to ensure reaction with all of the free groups remaining on the pre-condensate.

SUMMARY OF EXAMPLES I-XII

| Example | Polyacrylamide | Epoxidized aminoplast | Final product |
|---|---|---|---|
| I(A) | Medium MW | | |
| I(B) | | Dicy. plus DETA | |
| I(C) | | | I(A) plus I(B) |
| II | Low MW | | |
| III | High MW | | |
| IV | | Dicy. plus DMAPA | |
| V | | Dicy. plus TEPA | |
| VI | | | II plus I(B) |
| VII | | | III plus I(B) |
| VIII | | | III plus V |
| IX | | | III plus IV |
| X | | | II plus V; |
| XI | | | II plus IV |
| XII(A) | | Guan. plus DETA | |
| XII(B) | | | I(A) plus XII(A) |

TEST I

Evaluation of stability

All the final condensates (in solution) prepared according to Examples I(C), VI, VII, VIII, IX, X, XI, and XII were tested for their shelf life when exposed to room temperature and in accelerated tests at 60° C. None of the samples gelled or showed any substantial viscosity increase.

Comparative samples which were unreacted mixtures of the polyacrylamide solutions and epoxidized aminoplasts gelled after 1 to 4 weeks storage at room temperature and after from 2 to 48 hours in accelerated tests at 60° C.

TEST II

Evaluation of pigment retention qualities

Using TAPPI Standard Procedure T 413-ts 66 "Ash in Paper as Percent Ash," the results were as follows:

| | Percent ash, test with— | | Percent of TiO₂ retained, test with— | |
|---|---|---|---|---|
| | 1 lb./ton | 2 lbs./ton | 1 lb./ton | 2 lbs./ton |
| Blank | 4.09 | | 44.9 | |
| Paper treated with composition of Example: | | | | |
| I | 7.75 | 8.20 | 85.3 | 90.0 |
| VI | 5.92 | 6.09 | 65.0 | 66.9 |
| VII | 6.03 | 6.37 | 66.3 | 70.0 |
| VIII | 6.57 | 6.79 | 72.2 | 74.7 |
| IX | 6.92 | 7.33 | 76.1 | 80.5 |
| X | 6.60 | 6.73 | 72.6 | 73.9 |
| XI | 6.89 | 7.17 | 75.7 | 78.9 |
| XII | 6.18 | 6.59 | 68.0 | 72.3 |

The above results conclusively demonstrate that paper treated with various condensates coming within the scope of this invention (i.e.: Examples I and VI through XII) retains significantly higher amounts of TiO₂ pigment than untreated paper.

TEST III

Evaluation of dry strength improvement qualities

Using TAPPI Standard Procedure T 403-ts 63 "Bursting Strength of Paper," the results were as follows:

(A) Using a pulp with a pH=5.0, 2.5 g. Handsheets, bleached sulfite pulp, 410 c.s.f. dosage in lb./ton-dry resin on dry fiber.

| Example number | Percent increase in dry tensile strength over untreated paper | | | | | | | |
|---|---|---|---|---|---|---|---|---|
| | I | VI | VII | VIII | IX | X | XI | XII |
| Lb./ton: | | | | | | | | |
| 2 | 1.3 | 0 | −2.7 | −1.8 | 2.7 | −3.6 | −4.5 | −4.5 |
| 4 | 5.4 | 4.1 | −2.2 | −1.3 | 4.5 | 2.2 | −0.4 | 0.9 |
| 6 | 9.0 | 6.8 | −0.4 | 2.2 | 7.2 | 5.4 | 4.1 | 3.6 |
| 8 | 12.7 | 7.7 | 1.8 | 9.0 | 11.3 | 8.2 | 5.4 | 8.6 |
| 10 | 16.3 | 8.6 | 4.1 | 16.0 | 15.0 | 10.4 | 6.3 | 13.1 |
| 12 | 21.4 | 13.6 | 9.0 | 20.0 | 20.0 | 14.1 | 8.6 | 16.3 |
| 14 | 29.5 | 16.3 | 13.6 | 23.6 | 25.0 | 17.2 | 10.9 | 20.0 |
| 16 | 38.6 | 18.1 | 20.9 | 30.0 | 32.7 | 20.4 | 14.5 | 24.5 |
| 18 | 47.3 | 20.9 | 29.0 | 35.9 | 40.0 | 22.7 | 17.7 | 27.7 |
| 20 | 54.5 | 22.7 | 43.1 | 45.4 | 47.7 | 29.5 | 20.0 | 31.3 |

(B) Using a pulp with a pH=7.2, 2.5 g. Handsheets bleached sulfite pulp, 419 c.s.f. dosage in lb./ton-dry resin on dry fiber.

| Example number | Percent increase in dry tensile strength over untreated paper | | | | | | | |
|---|---|---|---|---|---|---|---|---|
| | I | VI | VII | VIII | IX | X | XI | XII |
| Lb./ton: | | | | | | | | |
| 2 | 2.1 | −6.3 | 1.3 | 0.4 | 0.8 | −3.4 | 0.4 | −3.8 |
| 4 | 5.1 | −5.1 | 2.9 | 1.7 | 2.9 | −1.3 | 2.5 | −3.8 |
| 6 | 8.0 | −3.4 | 4.2 | 2.9 | 5.9 | 1.3 | 4.7 | −0.8 |
| 8 | 12.1 | −1.3 | 4.2 | 4.2 | 9.3 | 4.7 | 5.5 | 1.3 |
| 10 | 16.1 | 2.1 | 5.1 | 6.3 | 13.6 | 9.7 | 5.5 | 4.2 |
| 12 | 20.8 | 5.5 | 8.9 | 8.9 | 17.4 | 12.3 | 5.5 | 7.2 |
| 14 | 25.5 | 8.9 | 12.1 | 12.3 | 21.5 | 14.4 | 8.5 | 10.2 |
| 16 | 31.0 | 13.1 | 15.7 | 16.1 | 24.6 | 17.0 | 10.2 | 12.3 |
| 18 | 37.0 | 17.8 | 20.8 | 23.4 | 27.6 | 17.4 | 12.8 | 14.9 |
| 20 | 45.5 | 22.5 | 27.6 | 31.8 | 29.3 | 17.4 | 14.4 | 19.1 |

The above test results conclusively show that the condensates of the subject invention increase the dry strength of paper treated therewith by up to 54.5% over the dry strength of untreated paper.

TEST IV

Evaluation of pitch dispersant qualities

Copper discs attached to a vibrator are submerged in a beaker containing paper pulp. Activation of the vibrator causes a deposit of pitch (contained in the pulp) to form on the copper plates. To determine the efficacy of a pitch dispersant, a measured quantity is added to the beaker before activating the vibrator. A composition that has pitch dispersant qualities will prevent deposition of some of the pitch.

The results of this test using the composition of Example I are as follows:

|  | Amount deposited (mg.) | |
| --- | --- | --- |
|  | A | B |
| Blank (no pitch dispersant) | 160.3 |  |
| Condensate of Example I | 20.4 | 45.0 |

In column A, .05 mg. was added, which is equivalent to about 2.0 lbs./ton.

In column B, .01 mg. was added, which is equivalent to about 0.4 lbs./ton.

The above test conclusively shows that the condensate of Example I, which is within the scope of this invention, has pitch dispersant qualities.

Summary of temperature and time parameters

Based upon the preceding examples and upon calculated estimates, the temperature and time parameters are as follows:

| Preparation of— | Temperature (° C.) | | Time (hours) | |
| --- | --- | --- | --- | --- |
|  | Minimum | Maximum | Minimum | Maximum |
| Polyacrylamide | 30 | 100 | 1.0 | 8.0 |
| Aminoplast (moiety) | 15 | 110 | 0.75 | 2.0 |
| Aminoplast (epoxidizing) | 15 | 100 | 1.0 | 3.0 |
| Pre-condensate | 50 | 100 | 0.25 | 4.0 |
| Condensate | 50 | 75 | 0.5 | 2.0 |

What we claim is:

1. A composition consisting essentially of the condensation product of:
   (I) a pre-condensate consisting of the reaction product of
      (A) about 1 to about 10 moles of a polyacrylamide which is non-ionic, straight chain, and water soluble, and whose viscosity range when in a 10% aqueous solution is from about 500 cps. to about 50,000 cps., with
      (B) about 1 mole of an epoxidized aminoplast whose aminoplast moiety is the condensation product of
         (a) an amino base selected from at least one of the group consisting of dicyandiamide, guanidine, guanylurea, ammeline, melamine, and the salts thereof,
         (b) at least one of the group consisting of formaldehyde and formaldehyde liberating compositions, and
         (c) an aliphatic amine containing at least two amine moieties of which one must be a primary,
      said aminoplast moiety being epoxidized with at least one agent of the group consisting of epichlorohydrin, epibromohydrin, substituted epichlorohydrin, and substituted epibromohydrin; and
   (II) a slight excess of at least one of the group consisting of urea, and aliphatic-substituted urea having at least two active hydrogen moieties sufficient to bridge all free reactive groups on the chain.

2. A composition according to claim 1 in which the molar ratios of the ingredients of the epoxidized aminoplast are 1.0 mole of (a), 2.0 to 6.0 mole of (b), 0.5 to 2.0 mole of (c), and 0.5 to 2.0 mole of epoxidizing agent.

3. A composition according to claim 1 in which the aminoplast is the condensation product of dicyandiamide, diethylenetriamine and formaldehyde and is epoxidized with epichlorohydrin.

4. A process of paper manufacture, which comprises adding the composition of claim 1 as a beater additive for the purpose of increasing pigment retention.

5. A process of paper manufacture, which comprises adding the composition of claim 1 as a beater additive for the purpose of improving dry strength.

6. A process of paper manufacture, which comprises adding the composition of claim 1 as a beater additive for the purpose of dispersing pitch.

7. A process for synthesizing a paper-treating composition consisting essentially of:
   (I) preparing a pre-condensate by reacting together for from about 0.25 to about 4.0 hours at a temperature of from about 50 to about 100° C.,
      (A) from about 1.0 to about 10.0 mole proportionally of a polyacrylamide which is non-ionic, straight chain, and water soluble, and whose viscosity range when in a 10% aqueous solution is from about 500 cps. to about 50,000 cps., with
      (B) about 1.0 mole proportionally of an epoxidized aminoplast whose aminoplast moiety is
         (i) synthesized by reacting together for from about 0.75 to about 2.0 hours at a temperature of from about 15 to about 110° C.,
            (a) about 1.0 mole proportionally of an amino base selected from at least one of the group consisting of dicyandiamide, guanidine, guanylurea, ammeline, melamine, and the salts thereof,
            (b) from about 2.0 to about 6.0 mole proportionally of at least one of the group consisting of formaldehyde and formaldehyde-liberating compositions, and
            (c) from about 0.5 to about 2.0 mole proportionally of an aliphatic amine containing at least two amine moieties of which one must be a primary, and then
         (ii) epoxidized by reacting the same for from about 1.0 to from about 3.0 hours at from about 15 to about 100° C. with from about 0.5 to about 2.0 mole proportionally of at least one agent of the group consisting of epichlorohydrin, epibromohydrin, substituted epichlorohydrin and substituted epibromohydrin; and
   (II) further reacting the said pre-condensate for from about 0.5 to about 2.0 hours at a temperature of from about 50 to about 75° C. with a quantity just in excess of the amount necessary to bridge all free reactive groups remaining on the pre-condensate chain of at least one of the group consisting of urea and aliphatic substituted urea having at least two active hydrogen moieties.

8. A process according to claim 7 in which the aminoplast is synthesized from about 1.0 mole proportionally of dicyandiamide, about 3.0 mole proportionally of formaldehyde, about 1.0 proportionally of diethylenetriamine, and about 1.0 mole proportionally of epichlorohydrin.

References Cited

UNITED STATES PATENTS

| | | | |
|---|---|---|---|
| 2,810,706 | 10/1957 | Frazier | 260—836 |
| 2,931,781 | 4/1960 | Hofmann | 260—836 |
| 3,053,797 | 9/1962 | D'Alelio | 260—836 |
| 3,053,798 | 9/1962 | D'Alelio | 260—836 |
| 3,053,799 | 9/1962 | D'Alelio | 260—836 |
| 3,501,553 | 3/1970 | Farber | 260—836 |

PAUL LIEBERMAN, Primary Examiner

U.S. Cl. X.R.

260—37 Ep, 41 B, 834

UNITED STATES PATENT AND TRADEMARK OFFICE
CERTIFICATE OF CORRECTION

PATENT NO. : 3,703,563

DATED : November 21, 1972

INVENTOR(S) : Stanley A. Lipowski and John C. Queen, Jr.

It is certified that error appears in the above-identified patent and that said Letters Patent are hereby corrected as shown below:

Column 8, in Test III (B), "419" should be --410--. Column 11, line 1, after "1.0" insert --mole--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*